(12) United States Patent
Laing et al.

(10) Patent No.: US 10,533,496 B2
(45) Date of Patent: Jan. 14, 2020

(54) COMPACT GAS TURBINE AIR INLET SYSTEM

(71) Applicant: General Electric Company, Schenectady, NY (US)

(72) Inventors: Donald Gordon Laing, Clear Lake, TX (US); Eric Tracy Watson, Houston, TX (US); Balakrishnan Ponnuraj, Sugar Land, TX (US); Ravinder Yerram, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 695 days.

(21) Appl. No.: 15/222,123

(22) Filed: Jul. 28, 2016

(65) Prior Publication Data
US 2018/0030895 A1    Feb. 1, 2018

(51) Int. Cl.
| | | |
|---|---|---|
| *F02C 7/045* | (2006.01) | |
| *F02C 7/04* | (2006.01) | |
| *F02M 35/12* | (2006.01) | |
| *F02C 3/04* | (2006.01) | |
| *F02C 7/052* | (2006.01) | |
| *F02C 7/055* | (2006.01) | |

(52) U.S. Cl.
CPC .............. *F02C 7/045* (2013.01); *F02C 3/04* (2013.01); *F02C 7/04* (2013.01); *F02C 7/052* (2013.01); *F02C 7/055* (2013.01); *F02M 35/1211* (2013.01); *F05D 2230/50* (2013.01); *F05D 2250/51* (2013.01); *Y02E 20/16* (2013.01)

(58) Field of Classification Search
CPC .... F02C 7/04; F02C 7/045; F02C 7/05; F02C 7/052; F02C 7/055; F02C 7/20; F02M 35/12; F02M 35/14; F02M 35/1211; F02M 35/1233; F02M 35/1288; F02M 35/10091; F02M 35/02; F02M 35/663; F02M 35/70; F02M 35/701; F01D 25/24; F01D 25/30; F05D 2250/50; F05D 2250/51; F05D 2250/511; F05D 2250/512; F05D 2260/96; B01D 45/14; B01D 46/00; F04D 29/663; F04D 29/664; F04D 29/70; F04D 29/701
See application file for complete search history.

(56) References Cited

U.S. PATENT DOCUMENTS

| | | | | |
|---|---|---|---|---|
| 2,112,608 | A | * | 3/1938 | Schmidt ................ F04D 29/663 415/119 |
| 2,741,325 | A | * | 4/1956 | Brown ..................... B64F 1/26 181/256 |
| 3,402,881 | A | * | 9/1968 | Moore .................... F02C 7/052 415/47 |

(Continued)

*Primary Examiner* — Gerald L Sung
*Assistant Examiner* — Alain Chau
(74) *Attorney, Agent, or Firm* — Fletcher Yoder, P.C.

(57) ABSTRACT

A system includes a modularized air inlet system. The modularized air inlet system includes an air filter house section configured to receive air via an air inlet. The modularized air inlet system also includes a transition/silencer section configured to direct the air from the modularized air inlet system, via an air outlet, into an air inlet plenum coupled to a gas turbine engine enclosure. The modularized air inlet system is configured to couple directly to the air inlet plenum and the gas turbine enclosure without an expansion joint disposed between the modularized air inlet system and the air inlet plenum.

17 Claims, 7 Drawing Sheets

(56) References Cited

U.S. PATENT DOCUMENTS

| | | | | |
|---|---|---|---|---|
| 3,485,442 A * | 12/1969 | Mitchener | | F01D 15/10 415/143 |
| 3,511,337 A * | 5/1970 | Pease | | F02C 7/045 181/214 |
| 3,698,509 A * | 10/1972 | Fitting | | F02C 7/045 181/214 |
| 3,815,342 A * | 6/1974 | Watts | | B01D 46/12 55/493 |
| 4,002,023 A * | 1/1977 | Hartmann | | F02C 7/04 290/52 |
| 4,050,913 A * | 9/1977 | Roach | | B01D 50/002 181/210 |
| 4,204,586 A * | 5/1980 | Hani | | F04D 29/664 181/229 |
| 4,622,050 A * | 11/1986 | O'Connor | | B01D 46/0068 55/283 |
| 5,140,819 A * | 8/1992 | Napier | | F02C 7/045 415/119 |
| 5,709,529 A * | 1/1998 | Parzych | | F01D 25/30 181/210 |
| 5,728,979 A * | 3/1998 | Yazici | | F24F 7/08 181/224 |
| 6,027,304 A * | 2/2000 | Arar | | F02C 7/045 415/116 |
| 6,082,094 A * | 7/2000 | Longardner | | F02C 7/00 60/801 |
| 6,250,068 B1 * | 6/2001 | Tajima | | F01D 25/02 60/803 |
| 6,736,238 B2 * | 5/2004 | Kerr | | F04D 29/663 181/229 |
| 6,802,690 B2 * | 10/2004 | Han | | F01D 25/30 138/37 |
| 7,051,534 B2 * | 5/2006 | Sandberg | | F01D 25/00 60/796 |
| 7,140,188 B2 | 11/2006 | Hosokawa et al. | | |
| 7,147,684 B2 * | 12/2006 | Anderson | | B01D 45/02 55/385.1 |
| 7,297,173 B2 | 11/2007 | Renwart et al. | | |
| 8,087,491 B2 * | 1/2012 | Merchant | | F01D 25/30 181/224 |
| 8,226,356 B2 * | 7/2012 | Kay | | F01D 5/147 415/119 |
| 8,579,074 B2 * | 11/2013 | Kosaka | | F02C 7/045 181/214 |
| 2004/0261418 A1 * | 12/2004 | Sandberg | | F01D 25/00 60/785 |
| 2006/0185334 A1 * | 8/2006 | Taketomi | | B01D 46/002 55/490 |
| 2009/0104024 A1 * | 4/2009 | Kay | | F01D 5/147 415/161 |
| 2010/0154631 A1 * | 6/2010 | Chillar | | F02C 7/052 95/63 |
| 2010/0251678 A1 * | 10/2010 | Mann | | F02C 7/052 55/483 |
| 2011/0094384 A1 * | 4/2011 | Mann | | B01D 45/14 96/214 |
| 2012/0240768 A1 * | 9/2012 | Mann | | B03C 1/0332 96/2 |
| 2013/0011249 A1 * | 1/2013 | Kippel | | B01D 46/10 415/200 |
| 2013/0087219 A1 * | 4/2013 | Rajesh | | F02C 7/05 137/338 |
| 2013/0168180 A1 * | 7/2013 | Merchant | | F02C 7/045 181/214 |
| 2014/0017068 A1 * | 1/2014 | Herrera | | F02C 7/05 415/121.3 |
| 2014/0020394 A1 * | 1/2014 | Laing | | F02C 7/00 60/772 |
| 2014/0219781 A1 * | 8/2014 | Watson | | F02M 35/12 415/119 |
| 2017/0009654 A1 * | 1/2017 | Maier | | F02C 7/18 |

* cited by examiner

COMPACT GAS TURBINE AIR INLET SYSTEM

BACKGROUND

The subject matter disclosed herein relates to an air inlet system for a gas turbine system.

Gas turbine generators are often used to produce electricity for a power grid. Gas turbine generators are typically stationary units disposed in a power plant, such as a combined heat and power (CHP) or combined cycle (CC) power plant. The gas turbine generators also may be used in mobile units, such as large trailers. The gas turbine generators typically include a gas turbine enclosed within an enclosure. An air inlet plenum provides air received from a gas turbine air inlet system to the gas turbine. However, these air inlet systems typically include many large components (e.g., filters, silencers, ductwork, expansion joints, chilling coils, heating coils, etc.). It is costly to ship these components to the site of installation (e.g., due to the need for multiple shipments). In addition, it takes significant time, effort, and equipment to install these components.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a system is provided. The system includes a modularized air inlet system. The modularized air inlet system includes an air filter house section configured to receive air via an air inlet. The modularized air inlet system also includes a transition/silencer section configured to direct the air from the modularized air inlet system, via an air outlet, into an air inlet plenum coupled to a gas turbine engine enclosure. The modularized air inlet system is configured to couple directly to the air inlet plenum and the gas turbine enclosure without an expansion joint disposed between the modularized air inlet system and the air inlet plenum.

In accordance with a second embodiment, a system is provided. The system includes a modularized air inlet system. The modularized air inlet system includes an air filter house section configured to receive air via an air inlet. The modularized air inlet system also includes a transition/silencer section configured to direct the air from the modularized air inlet system, via an air outlet, into an air inlet plenum coupled to a gas turbine engine enclosure. The transition/silencer section includes a wall disposed upstream of the air outlet relative to a longitudinal axis of the gas turbine enclosure. The wall extends in a vertical direction from a top surface to a bottom surface of the transition/silencer section, and the wall extends in a horizontal direction beyond a perimeter of the air outlet. The modularized air inlet system also includes a first multiple of turning vanes configured to turn the air horizontally from a first direction parallel to the longitudinal axis to a second direction crosswise to the longitudinal axis towards the air outlet. The first multiple of turning vanes flank the wall. The modularized air inlet system further includes a second multiple of turning vanes disposed behind the wall adjacent the air outlet. The second multiple of turning vanes flank the air outlet. The second multiple of turning vanes is configured to turn the air vertically from the second direction to a third direction crosswise to the longitudinal axis into the air outlet. The modularized air inlet system yet further includes multiple silencers disposed behind the wall adjacent the air outlet, wherein the multiple silencers are disposed between the first and second multiples of turning vanes. The modularized air inlet system even further includes multiple foreign object damage (FOD) screens disposed between the wall, the first multiple of turning vanes, and the second multiple of turning vanes. The multiple FOD screens flank the air outlet.

In accordance with a third embodiment, a system is provided. The system includes a gas turbine enclosure, a gas turbine engine disposed in the gas turbine enclosure, and an air inlet plenum coupled to the gas turbine enclosure. The air inlet plenum is configured to direct air to the gas turbine engine. The system also includes a modularized air inlet system. The modularized air inlet system includes an air filter house section configured to receive the air via an air inlet. The modularized air inlet system also includes a transition/silencer section configured to direct the air from the modularized air inlet system, via an air outlet, into an air inlet plenum coupled to a gas turbine engine enclosure. The modularized air inlet system is coupled directly to the air inlet plenum and the gas turbine enclosure without an expansion joint disposed between the modularized air inlet system and the air inlet plenum.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
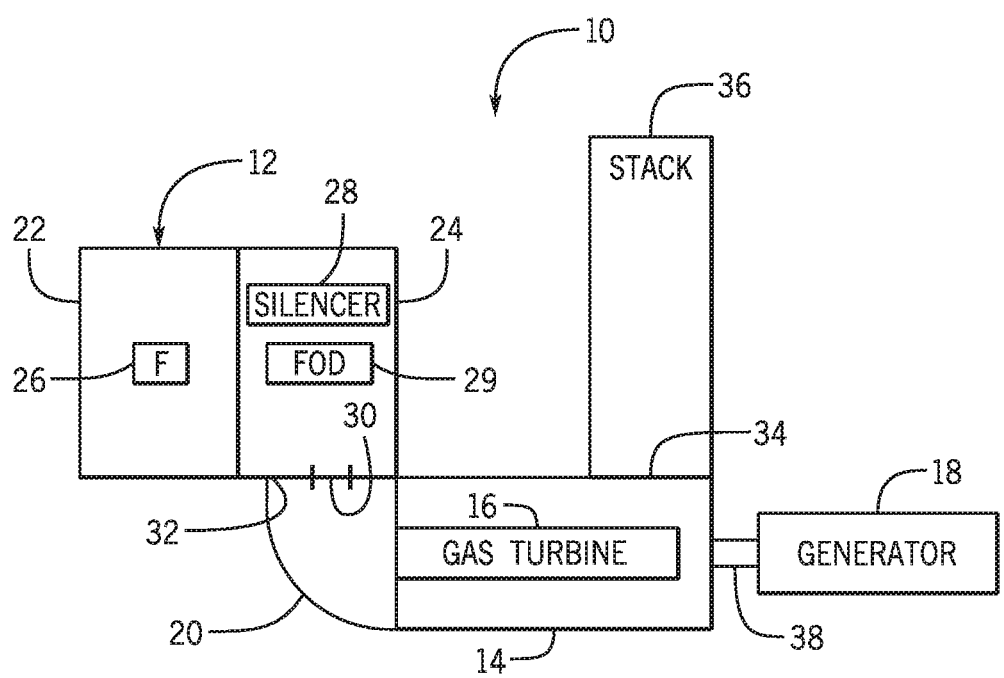
FIG. 1 is a schematic side view of an embodiment of a gas turbine generator having a modularized air inlet system.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to a modularized air inlet system. The modularized air inlet system includes two modular sections, an air filter house section and a transition/silencer section. The modular sections may be transported individually or together. A framework couples the modularized air inlet system to a gas turbine enclosure resulting in minimizing transportation costs and reducing site installation time. The modularized air inlet system may be more compact compared to typical gas turbine air inlet systems. For example, the air filter house section may include a single face axial inlet to enable adjacent gas turbines to be located in closer proximity. In addition, the transition/silencer section may be directly coupled (e.g., without an expansion joint disposed between) to an air inlet plenum coupled to the gas enclosure. Directly coupling the transition/silencer section to the air inlet plenum reduces the overall height between the top of the modularized air inlet system and the top of the air inlet plenum, while also reducing site installation time. In addition, by mounting the air inlet system directly on to the air inlet plenum/enclosure, the loads are taken through the gas turbine package base frame. As a result, there would be no additional site foundation required to support the air inlet system, which simplifies the foundation work and reduces installation time. In certain embodiments, the transition/silencer section includes a wall disposed upstream (e.g., relative to a longitudinal axis of the gas turbine enclosure) of an air outlet. A first plurality of turning vanes may flank the wall. The first plurality of turning vanes may turn the air horizontally (e.g., approximately 90 degrees) from a first direction parallel to the longitudinal axis to a second direction crosswise to the longitudinal axis towards the air outlet (and around the longitudinal ends of the walls). A second plurality of turning vanes may be disposed downstream of (and behind) the wall (e.g., relative to the longitudinal axis of the gas turbine enclosure) adjacent the air outlet. The second plurality of turning vanes may turn the air vertically (e.g., approximately 90 degrees) from the second direction to a third direction (e.g., radial direction relative to the longitudinal axis) to a third direction crosswise to the longitudinal axis into the air outlet. The second plurality of turning vanes in conjunction with a curved or rounded air outlet may provide an even flow distribution of the air entering the air inlet plenum, while minimizing pressure drop and increasing performance of the gas turbine engine. The first plurality of turning vanes may also be configured to minimize pressure drop and increase performance of the gas turbine engine. In certain embodiments, a plurality of foreign object damage (FOD screens) may be disposed behind the wall and between the first and second pluralities of turning vanes. The plurality of FOD screens (e.g., wire mesh screens) may also be configured to minimize pressure drop and increase performance of the gas turbine engine. In certain embodiments, a plurality of silencers (e.g., square cross-section perforated tubes, splitters, etc.) may be disposed between the behind the wall and between the first and second pluralities of turning vanes (e.g., upstream of the FOD screens). Overall, the modularized air inlet system may be easier to transport, while also reducing costs associated with transport. In addition, the modularized air inlet system reduces installation time and costs as well as time utilizing equipment such as cranes. Further, the modularized air inlet system may minimize pressure drop within the compact air inlet system, while improving the efficiency and performance of the gas turbine engine.

FIG. 1 is a schematic side view of an embodiment of a gas turbine generator 10 (e.g., gas turbine system) having a modularized air inlet system 12. The modularized air inlet system 12, in various embodiments, has applicability for any gas turbine, including both stationary and mobile gas turbine power generation units and also mechanical drive units such as in gas compression/pumping applications. As described in greater detail below, the modularized air inlet system 12 may be more compact both vertically and horizontally to reduce the footprint of the air inlet system 12. This enables adjacent gas turbine systems to be located in closer proximity. In addition, features of the modularized air inlet system 12 minimize the pressure drop within the air inlet system 12 while increasing the efficiency of the gas turbine system. Further, the modularity of the air inlet system 12 makes the system 12 easier to transport while reducing transportation or shipping costs. The modularity of the air inlet system 12 also enables faster installation at reduced installation costs as well as less time utilizing equipment (e.g., cranes) during installation.

As illustrated, the gas turbine generator or power generation unit 10 includes a gas turbine enclosure 14 that houses a gas turbine engine 16 and an electrical generator 18 driven by the gas turbine engine 16. The gas turbine enclosure 14 is coupled to an air inlet plenum 20. The air inlet plenum 20 is coupled to the modularized air inlet system 12. The modularized air inlet system 12 may include both (e.g., in a single module) a gas turbine air inlet filtration/conditioning system (e.g., for providing air to the gas turbine engine 16) and a ventilation inlet filtration/conditioning system (e.g., for providing air to ventilate the gas turbine enclosure 14). The modularized air inlet system 12 is directly coupled to air inlet plenum 20 without an expansion joint (and without a significant amount of bolting and gaskets typically used for coupling) disposed between the modularized air inlet system 12 and the air inlet plenum 20. Tolerances and relative movement between the modularized air inlet system 12 and the air inlet plenum 20 are reduced (e.g., relative to when an expansion joint is utilized) that a highly compliant gasket would be sufficient for use between the system 12 and the air inlet plenum 20.

The modularized air inlet system 12 includes an air filter house section or module 22 and a transition/silencer section or module 24. The air filter house section 22 includes one or more filters 26 (e.g., but not limited to, static filters, pulse clean filters, etc.) to filter the air subsequently provided from the air inlet system 12 to the air inlet plenum 20 and the gas turbine engine 16 and/or enclosure 14. The transition/silencer section 24 includes one or more silencers 28 (e.g., but not limited to, square cross-section perforated tubes, splitters, etc.) to reduce noise. The transition/silencer section 24 also includes one or more FOD screens 29 to block debris or foreign articles from entering the gas turbine 16. In certain embodiments, the sections 22, 24 may include chilling coils, heating coils, evaporative cooling, or other components. As described in greater detail below, the transition/silencer section 24 includes a number of turning vanes to turn the air both horizontally and vertically within the transition/silencer section 24 prior to the air being provided to the air inlet plenum 20. The transition/silencer section 24 is the portion of the modularized air inlet system 12 that is directly coupled to air inlet plenum 20. The transition/silencer section 24 includes an air outlet 30 that provides air to the air inlet plenum 20 and subsequently to the gas turbine engine 16 and/or enclosure 14. The air outlet 30 is fluidly coupled to an air intake port 32 of the air inlet plenum 20. The air inlet plenum directs air (e.g., provided by the air inlet system 12) into the gas turbine engine 16. For example, the air inlet plenum 20 may direct air into a compressor of the gas turbine engine 16. For example, the gas turbine engine 16 may compress the air received from the air inlet plenum 20, mix the air with fuel, and combust the air-fuel mixture to drive one or more turbines. The enclosure includes an exit port 34. The exit port 34 is coupled to an exhaust plenum or duct (not shown) which via expansion joint is coupled to an exhaust stack 36 for venting exhaust gases from the gas turbine 16. The gas turbine 16 includes a drive shaft 38 that extends through the enclosure 14 and couples to the generator 18.

Figure 2:
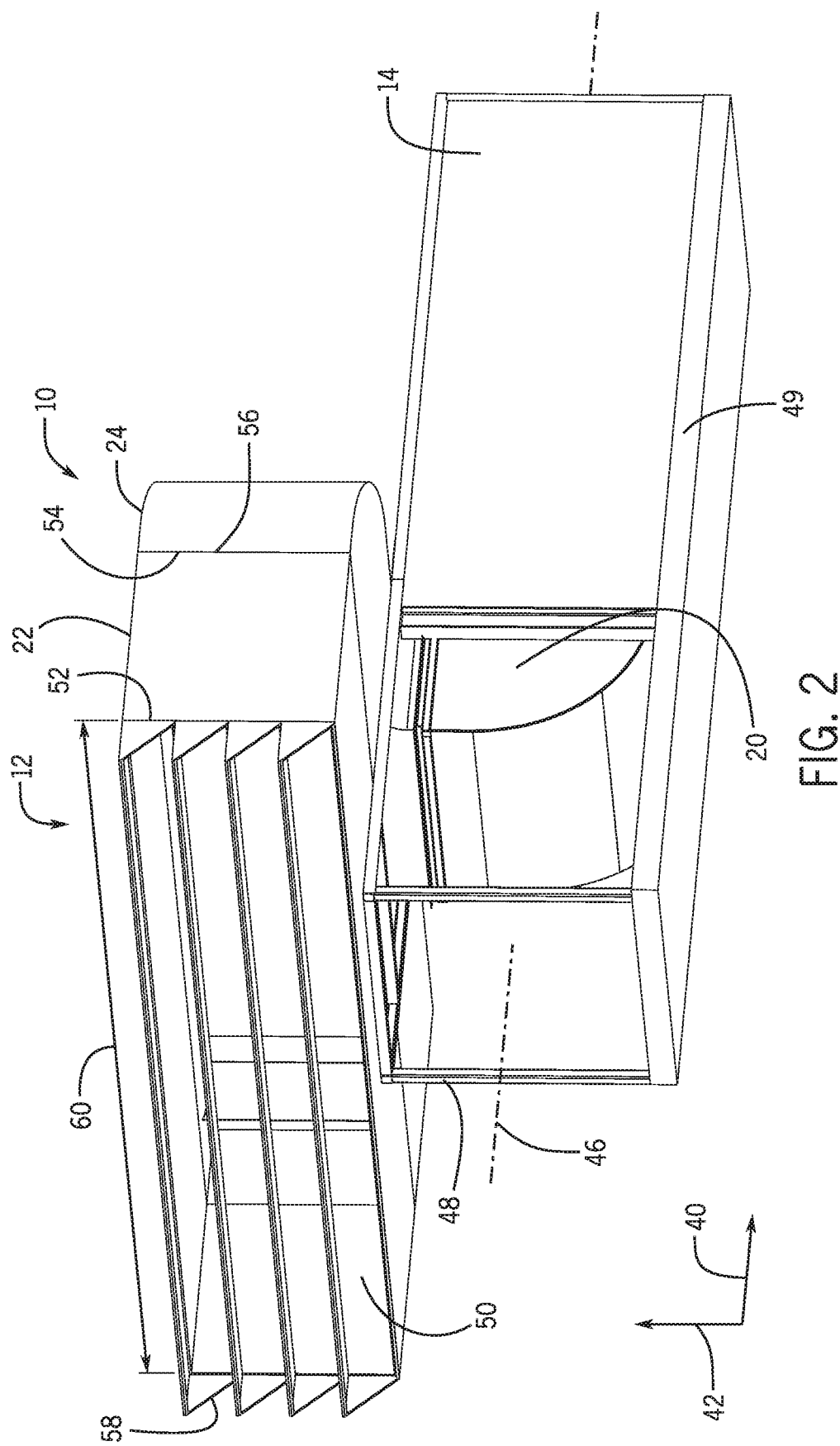
FIG. 2 is a perspective view of an embodiment of a modularized air inlet system coupled to a gas turbine enclosure.

FIG. 2 is a perspective view of an embodiment of the modularized air inlet system 12 coupled to the gas turbine enclosure 14. As indicated in the legend, arrow 40 indicates an axial axis or direction and arrow 42 indicates a radial axis or direction. As described above, the modularized air inlet system 12 includes the air filter house section 22 and the transition/silencer section 24. The air filter house section 22 is located axially 40 upstream of the transition/silencer section 24 relative to a longitudinal axis 46 of the enclosure 14 and/or the gas turbine engine 16. In general, modularized air inlet system 12 is located axially 40 upstream of the gas turbine enclosure 14. The modularized air inlet system 12 is coupled to a framework 48 that supports the system 12. The framework 48 couples the modularized air inlet system 12 to the enclosure 14 by directly coupling to the enclosure 14 (e.g., an axial end of the enclosure 14). By mounting the air inlet system 12 directly on to the air inlet plenum 20/enclosure 14, the loads are taken through the gas turbine package base frame 49. As a result, there would be no additional site foundation required to support the air inlet system, which simplifies the foundation work and reduces installation time. The sections 22, 24 may be coupled to and supported by a single framework 48 or separate frameworks 48. The sections 22, 24 are coupled to the framework 48 at site. The framework 48 coupled to the enclosure 14 reduces transportation costs and reduces site installation time. As mentioned above, the transition/silencer section 24 is directly coupled (e.g., without an expansion joint) to the air inlet plenum 20. As described in greater detail below, this reduces the height from a top of the modularized air inlet system (in particular, the transition/silencer section 24) to a top surface of the air inlet plenum 20. In addition, the air filter house section 22 of the air inlet system 12 includes an air inlet 50 disposed on axial end 52 (e.g., relative to the longitudinal axis 46) opposite an axial end 54 coupled to an axial end 56 of the transition/silencer section 24. As depicted, the air filter house section 22 includes louvers or weatherhoods 58 to protect the filter elements from rain and snow. Locating the air inlet on the axial end 52 of the air filter house section 22 reduces a width 60 of the air inlet system 12. This enables adjacent gas turbine system to be located in closer proximity. The compactness of the air inlet system 12 both vertically and horizontally reduces the footprint/envelope of the air inlet system 12 for reducing transportation costs and reducing site installation time.

Figure 3:
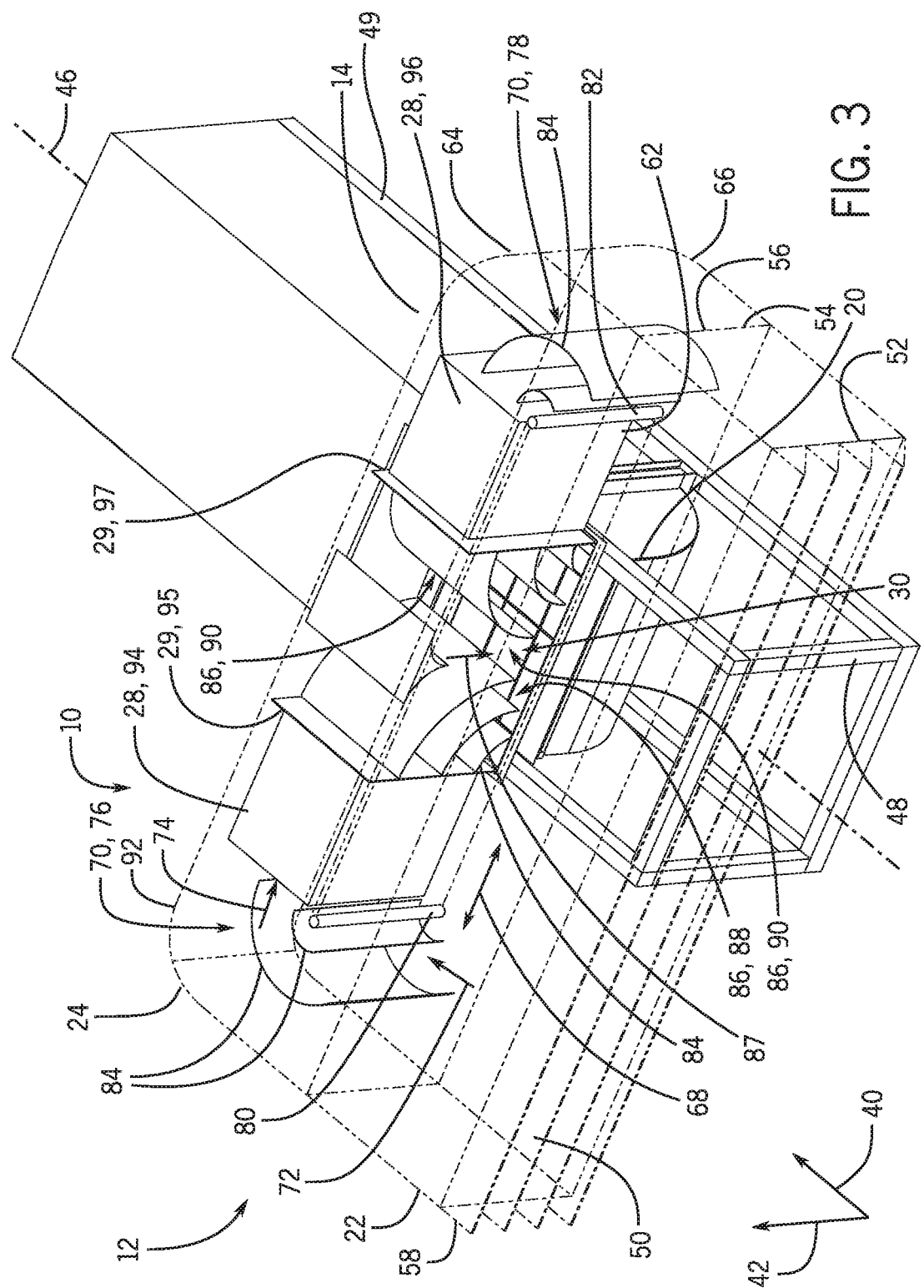
FIG. 3 is a top perspective view of an embodiment of the modularized air inlet system of FIG. 2 coupled to the gas turbine enclosure.

FIG. 3 is a top perspective view of an embodiment of the modularized air inlet system 12 of FIG. 2 coupled to the gas turbine enclosure 14 (e.g., via the air inlet plenum 20 and the framework 48). The modularized air inlet system 12 is as described above. The modularized air inlet system 12 includes features to reduce pressure drop within the compact air inlet system 12 while increasing the performance and efficiency of the gas turbine system 10. As depicted, the transition/silencer section 24 includes a wall 62 disposed upstream (e.g., relative to the longitudinal axis 46) of and adjacent to the air outlet 30. The wall 62 extends radially 42 or vertically from a top wall or surface 64 to a bottom wall or surface 66. The wall 62 also extends in a horizontal direction 68 beyond a perimeter of the air outlet 30. The transition/silencer section 24 also includes a first plurality of turning vanes 70 configured to turn the air horizontally (e.g., approximately 90 degrees) from a first direction 72 parallel to the longitudinal axis 46 to a second direction 74 crosswise to the longitudinal axis 46 towards the air outlet 30. The first plurality of turning vanes 70 extends radially 42 or vertically from the top wall or surface 64 to the bottom wall or surface 66. As depicted, the first plurality of turning vanes 70 includes a first set of turning vanes 76 and a second set of turning vanes 78 that flank respective longitudinal ends 80, 82 of the wall 62. Both the first set of turning vanes 76 and the second set of turning vanes 78 are concentrically arranged relative to the respective longitudinal ends 80, 82. As depicted, the first and second sets of turning vanes 76, 78 each include two turning vanes 84. However, in certain embodiments, the first and second sets of turning vanes 76, 78 may each include a different number of turning vanes (e.g., 3, 4, 5, etc.). In certain embodiments, the longitudinal ends 82 of the wall 62 may be rounded to facilitate the turning of the air from the first direction 72 to the second direction 74.

The transition/silencer section 24 further includes a second plurality of turning vanes 86 configured to turn the air vertically (e.g., approximately 90 degrees) from the second direction 74 to a third direction 87 (e.g., radially 42) crosswise to the longitudinal axis 46 into the air outlet 30. The second plurality of turning vanes 86 are disposed downstream of (e.g., relative to the longitudinal axis 46) and behind the wall 62. In particular, the second plurality of turning vanes 86 are disposed over the air outlet 30. The second plurality of turning vanes 86 includes a third set of turning vanes 88 and a fourth set of turning vanes 90 that flank the air outlet 30. Both the third set of turning vanes 88 and the fourth set of turning vanes 90 are concentrically arranged relative to respective edges of the air outlet 30 (or a line parallel to the longitudinal axis 46). As depicted, the third and fourth sets of turning vanes 88, 90 each include three turning vanes 84. However, in certain embodiments, the third and fourth sets of turning vanes 88, 90 may each include a different number of turning vanes 84 (e.g., 2, 4, 5, etc.). The second plurality of turning vanes 86 extend axially 40 (e.g., relative to the longitudinal axis 46) from the wall 62 to a rear wall 92 of the transition/silencer section 24.

The transition/silencer section 24 yet further includes a plurality of silencers 28 disposed adjacent the air outlet 30. In particular, a first silencer 94 (e.g., first series of square perforated tubes) and a second silencer 96 (e.g., second series of square perforated tubes) flank the air outlet 30. The silencers 94, 96 are disposed downstream of (e.g., relative to the longitudinal axis 46) and behind the wall 62. In addition, the first silencer 94 is disposed between the first set of turning vanes 76 and the third set of turning vanes 88. The second silencer 96 is disposed between the second set of turning vanes 78 and the fourth set of turning vanes 90.

The transition/silencer section 24 even further includes a plurality of FOD screens 29 disposed adjacent the air outlet 30. In particular, a first FOD screen 95 and a second FOD 97 screen flank the air outlet 30. The FOD screens 95, 97 are disposed downstream of (e.g., relative to the longitudinal axis 46) and behind the wall 62. In addition, the first FOD screen 95 is disposed between the first set of turning vanes 76 and the third set of turning vanes 88. In particular, the first FOD screen 95 is disposed downstream of the first silencer 94. The second FOD screen 97 is disposed between the second set of turning vanes 78 and the fourth set of turning vanes 90. In particular, the second FOD screen 97 is disposed downstream of the second silencer 96. As depicted, the FOD screens 95, 97 are vertical FOD screens. Alternatively, the FOD screens 95, 97 may be arranged relative to each other to form an inverted V-shape. In certain embodiments, as an alternative FOD screen (see FOD screen 99 in FIG. 6) could be disposed horizontally within and across the air inlet plenum 20.

Functionally, air enters the air inlet system 12 via the air inlet 50 of the air filter house section 22 where the air is then filtered (e.g., via one or more filters 26) and/or conditioned. Upon flowing into the transition/silencer section 24, the air is first turned horizontally (e.g., approximately 90 degrees) from the first direction 72 to the second direction 74 towards the air outlet 30 via the first plurality of turning vanes 70. The air then flows through the silencers 94, 96 and then the FOD screens 95, 97, where the air is then turned vertically (e.g., approximately 90 degrees) from the second direction 74 to the third direction 87 into the air outlet 30 via the second plurality of turning vanes 86. The air is then provided from the air outlet 30 to the air inlet plenum 20 and then the gas turbine engine 16.

Figure 4:
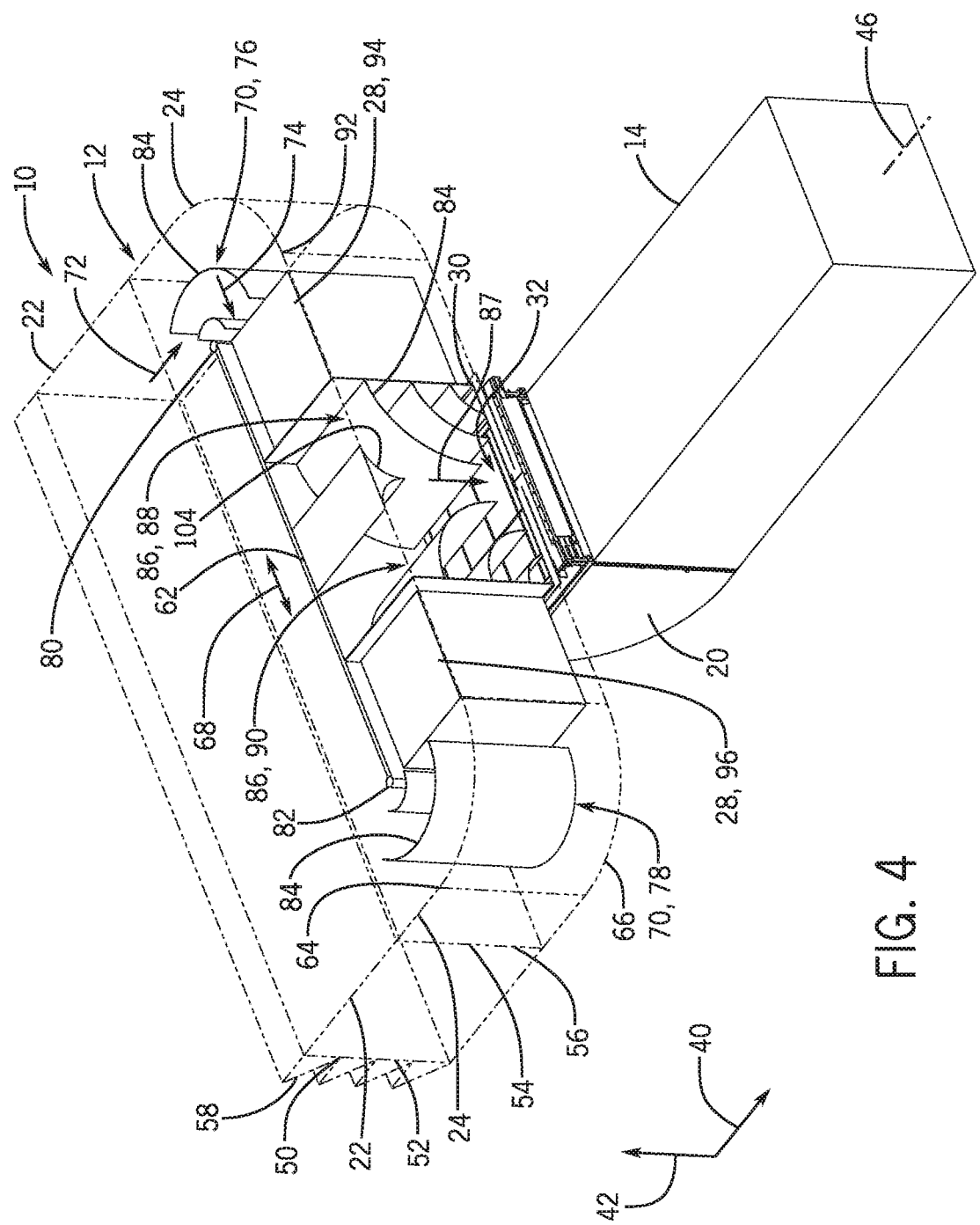
FIG. 4 is a rear perspective view of an embodiment of the modularized air inlet system of FIG. 2 coupled to an air inlet plenum and gas turbine enclosure.
Figure 5:
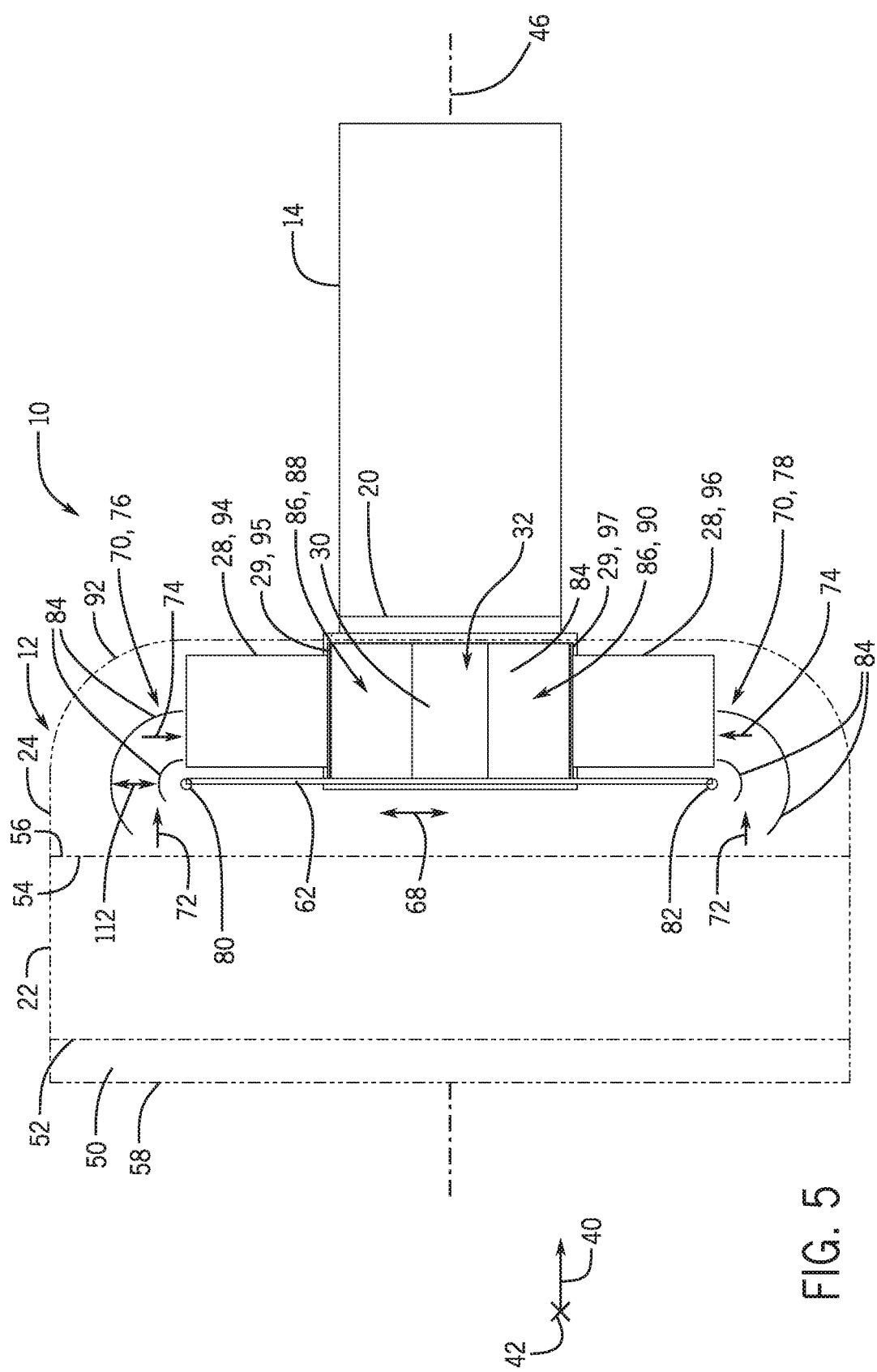
FIG. 5 is a top view of an embodiment of the modularized air inlet system (with the top wall removed) of FIG. 2 coupled to the air inlet plenum and the gas turbine enclosure)
Figure 6:
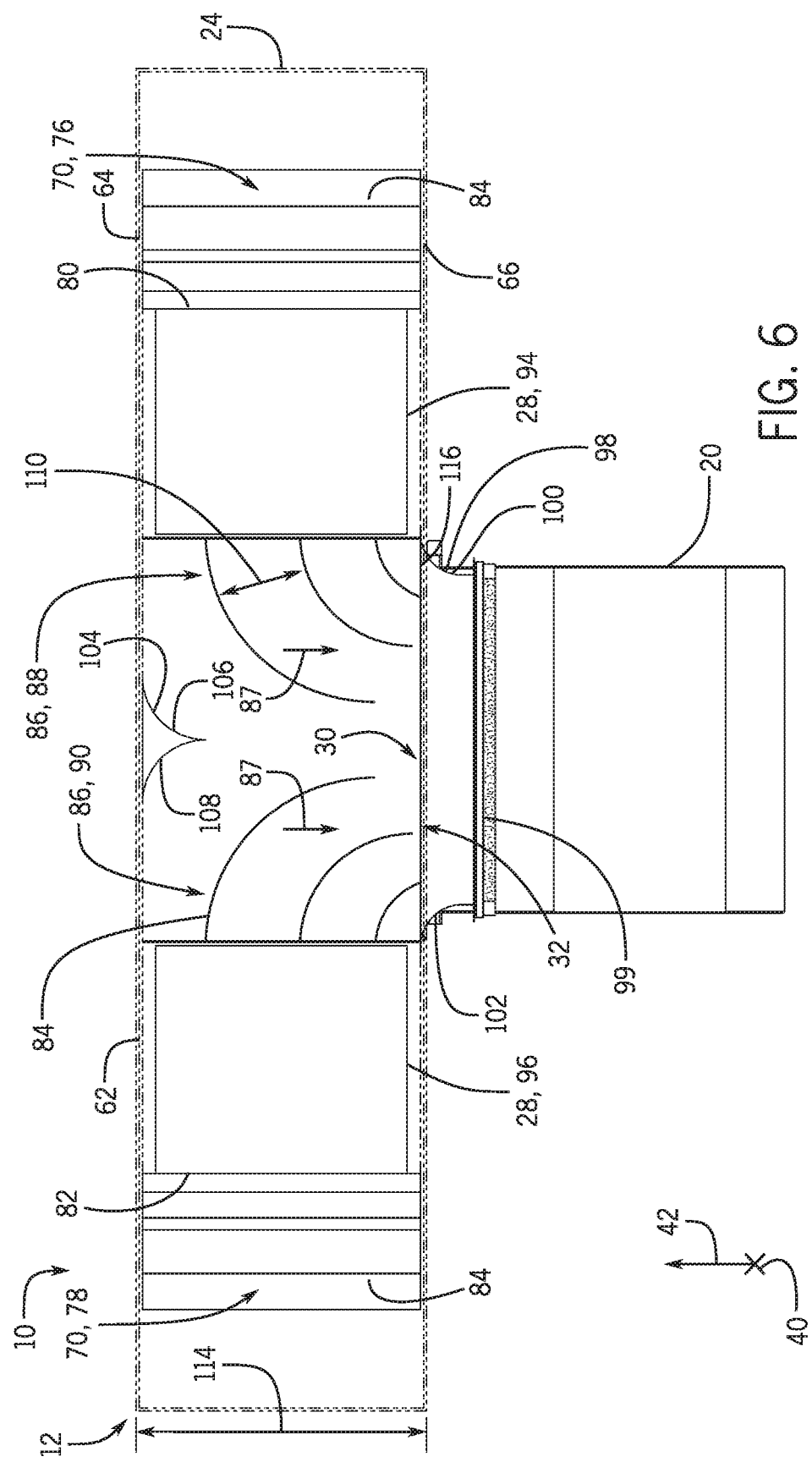
FIG. 6 is a rear view of an embodiment of the modularized air inlet system (with the rear wall removed) of FIG. 2 coupled to the air inlet plenum.

FIGS. 4-6 are different views of an embodiment of the modularized air inlet system 12 of FIG. 2 coupled to the air inlet plenum 20 and/or gas turbine enclosure 14. The air inlet system 12 is as described above. As depicted in FIGS. 4 and 6, the air inlet plenum 20 includes a portion 98 (having walls 100) that help the transition of the flow of air through the air outlet 30 into the air inlet plenum 20. Walls 100 of the portion 98 that run parallel to the longitudinal axis 46 each include a curved wall portion 102 flanking the air outlet 30. The curved wall portions 102 have a curvature similar to or the same as the respective turning vanes 84 of the second plurality of turning vanes 86 adjacent the curved wall portions 102. The curved wall portions 102 facilitate the turning of the air from the second direction 74 (e.g., from the air outlet 30) to the third direction 87 into the air inlet plenum 20.

Also, as depicted in FIGS. 4 and 6, the air inlet system 12 (e.g., the transition/silencer section 24) includes a protrusion 104 located above the air outlet 30 that radially 42 extends from the top wall 64. The protrusion 104 extends axially 40 from the wall 62 to the rear wall 92. The protrusion 104 includes a curved surface 106 and a curved surface 108 facing the third and fourth sets of turning vanes 88, 90. The curved surfaces 106, 108 have a curvature similar to or the same as the respective turning vanes 84 of the third and four sets of turning vanes 88, 90 adjacent the surfaces 106, 108. The curved surfaces 106, 108 of the protrusion 104 facilitate the turning of the air from the second direction 74 to the third direction 87 into the air outlet 30 and subsequently into the air inlet plenum 20. As depicted, the turning vanes 84 of the second plurality of turning vanes 86 of each respective set 88, 90 are spaced apart from each other by a distance 110. In certain embodiments, the distance 110 is the same between the vanes 84. In other embodiments, the distance 110 may vary. The position of the turning vanes 84 of the second plurality of turning vanes 86 in conjunction with the curved wall portions 102 and the curved surfaces 106, 108 enables an even flow distribution of the air entering the air outlet 30 and subsequently the air inlet plenum 20, while reducing the associated pressure drop and increasing the gas turbine performance.

As depicted, in FIGS. 4 and 5, the turning vanes 84 of the first plurality of vanes 70 of each respective set 76, 78 are spaced apart from each other by a distance 112. In certain embodiments, the distance 112 is the same between the vanes 84. In other embodiments, the distance 112 may vary. The position of the turning vanes 84 of the first plurality of turning vanes 70 in conjunction with the rounded longitudinal ends 80, 82 of the wall 62 enables an even flow distribution of the air approaching the silencers 94, 96, the FOD screens 95, 97, and the second plurality of vanes 86, while reducing the associated pressure drop and increasing the gas turbine performance.

Further, as depicted in FIG. 6, a height 114 from the top surface 64 of the modularized air inlet system 12 disposed opposite of the air inlet plenum 20 to a top surface 116 of the air inlet plenum 20 that contacts the modularized air inlet system 12 is between approximately 2.0 meters and 4.0 meters (e.g., ±0.05 meters). In certain embodiments, the height 114 may range from approximately 2.0 to 3.0 meters, 2.0 to 2. 5 meters, 2.5 to 3.0 meters, 3 to 3.35 meters, 3.35 to 3.7 meters, 3.7 meters to 4.0 meters, and 3.2 to 3.5 meters, and all subranges therein. For example, the height 114 may be approximately 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 meters. Directly coupling the air inlet system 12 to the air inlet plenum 20 without an expansion joint (and a significant amount of bolting and gaskets typically used for coupling) disposed between the modularized air inlet system 12 and the air inlet plenum 20 enables a vertically shorter and more compact air inlet system 12.

Figures 7, 8:
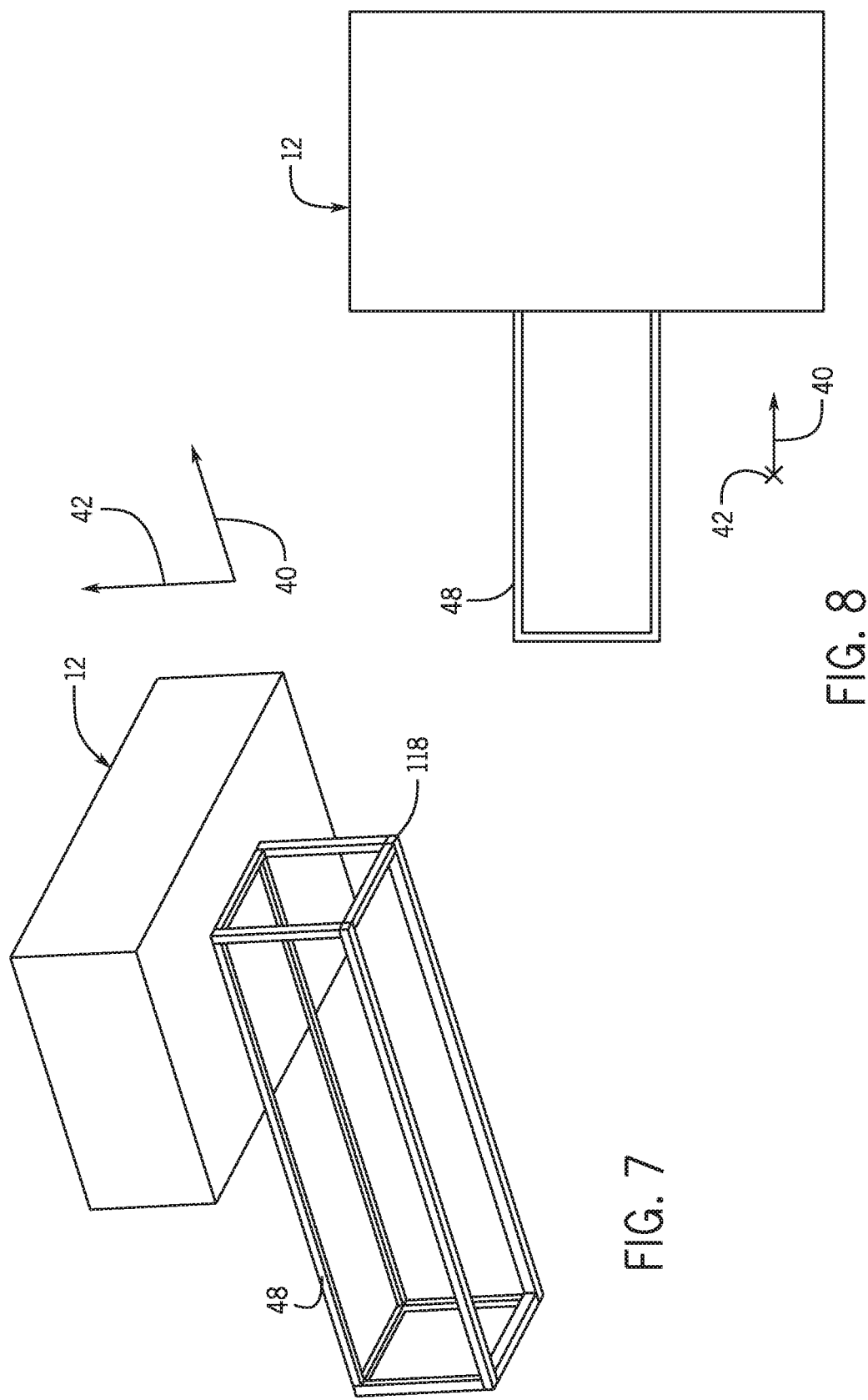
FIG. 7 is a bottom perspective view of an embodiment of a modularized air inlet system coupled to a framework.
FIG. 8 is a top perspective view of an embodiment of the modularized air inlet system of FIG. 7 coupled to the framework.

FIGS. 8 and 9 are different views of an embodiments of the modularized air inlet system 12 coupled to a framework 48. The modularized air inlet system 12 and the framework 48 are as described above. As depicted, the modularized air inlet system 12 is disposed above and coupled to a single axial end 118 of the framework 48. As depicted, the framework 48 is centrally aligned underneath the modularized air inlet system 12. In certain embodiments, the framework 48 may be off-centered relative to the air inlet system 12.

Technical effects of the subject matter include providing a compact, modularized air inlet system for a gas turbine system that has little pressure drop. The compact, modularized air inlet system may be transported at a lower cost relative to typical air inlet systems. In addition, the modularized air inlet system may be installed at a lower cost and in less time than typical air inlet systems.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a modularized air inlet system, comprising:
an air filter house section configured to receive air via an air inlet; and
a transition/silencer section configured to direct the air from the modularized air inlet system, via an air outlet, into an air inlet plenum coupled to a gas turbine engine enclosure;
wherein the modularized air inlet system is configured to couple directly to the air inlet plenum and the gas turbine enclosure, and wherein the transition/silencer section comprises a wall disposed within the modularized air inlet system upstream of the air outlet relative to a longitudinal axis of the gas turbine enclosure, wherein the wall extends in a vertical direction from a top surface to a bottom surface of the transition/silencer section, and the wall extends in a horizontal direction beyond a perimeter of the air outlet; and
wherein the transition/silencer section comprises a first plurality of turning vanes configured to turn the air horizontally from a first direction parallel to the longitudinal axis to a second direction crosswise to the longitudinal axis towards the air outlet, and wherein the first plurality of turning vanes comprises a first set of turning vanes and a second set of turning vanes, and wherein the first set of turning vanes and the second set of turning vanes respectively flank and extend around first and second longitudinal ends of the wall, the first and second longitudinal ends being located along the horizontal direction.

2. The system of claim 1, wherein a height from a top surface of the modularized air inlet system disposed opposite of the air inlet plenum to a top surface of the air inlet plenum that contacts the modularized air inlet system is between about 2.0 meters and 4.0 meters.

3. The system of claim 1, wherein the first set of turning vanes comprises a first pair of concentrically arranged turning vanes and the second set of turning vanes comprises a second pair of concentrically arranged turning vanes.

4. The system of claim 1, wherein first and second longitudinal ends of the wall along the horizontal direction are rounded to facilitate the turning of the air from the first direction to the second direction.

5. The system of claim 1, wherein the transition/silencer section comprises a second plurality of turning vanes configured to turn the air vertically from the second direction to a third direction crosswise to the longitudinal axis into the air outlet.

6. The system of claim 5, wherein the second plurality of turning vanes are disposed downstream of the wall relative to the longitudinal axis, and the second plurality of turning vanes are disposed behind the wall adjacent the air outlet.

7. The system of claim 6, wherein the second plurality of turning vanes comprises a third set of turning vanes and a fourth set of turning vanes, and wherein the third set of turning vanes and the fourth set of turning vanes respectively flank the air outlet.

8. The system of claim 7, wherein the third set of turning vanes comprises three concentrically arranged turning vanes and the fourth set of turning vanes comprises another three concentrically arranged turning vanes.

9. The system of claim 8, wherein the transition/silencer section comprises a plurality of silencers, and the plurality of silencers comprises a first silencer disposed between the first and third sets of turning vanes and a second silencer disposed between the second and fourth sets of turning vanes.

10. The system of claim 8, wherein the transition/silencer section comprises a protrusion located above the air outlet that extends from a top wall of the transition/silencer section, wherein the protrusion is located between the wall and the third and fourth sets of turning vanes, and the protrusion is configured to facilitate the turning of the air from the second direction to the third direction into the air outlet.

11. The system of claim 7, wherein the transition/silencer section comprises a plurality of foreign object damage (FOD) screens disposed adjacent the air outlet, wherein the plurality of FOD screens comprises a first FOD screen and a second FOD screen that flank the air outlet, wherein the first FOD screen is disposed between the wall, the first set of turning vanes, and the third set of turning vanes, and wherein the second FOD screen is disposed between the wall, the second set of turning vanes, and the fourth set of turning vanes.

12. The system of claim 7, wherein the transition/silencer section comprises a third FOD screen disposed horizontally across the air inlet plenum downstream of the second plurality of turning vanes.

13. The system of claim 1, comprising a framework coupled to and supporting the modularized air inlet system, wherein the framework is configured to couple the modularized air inlet system to the gas turbine enclosure and the air inlet plenum, and the framework is configured to be coupled to a gas turbine base frame.

14. The system of claim 1, wherein the air filter house section comprises a first axial end and second axial end relative to a longitudinal axis of the gas turbine enclosure, and second axial end is coupled to the transition/silencer section, and the air inlet is disposed on the first axial end.

15. A system, comprising:
a modularized air inlet system, comprising:
an air filter house section configured to receive air via an air inlet; and
a transition/silencer section configured to direct the air from the modularized air inlet system, via an air outlet, into an air inlet plenum coupled to a gas turbine engine enclosure, wherein the transition/silencer section comprises:
a wall disposed upstream of the air outlet relative to a longitudinal axis of the gas turbine enclosure, wherein the wall extends in a vertical direction from a top surface to a bottom surface of the transition/silencer section, and the wall extends in a horizontal direction beyond a perimeter of the air outlet;
a first plurality of turning vanes configured to turn the air horizontally from a first direction parallel to the longitudinal axis to a second direction crosswise to the longitudinal axis towards the air outlet, and the first plurality of turning vanes flank the wall;
a second plurality of turning vanes disposed behind the wall adjacent the air outlet, wherein the second plurality of turning vanes flank the air outlet, and the second plurality of turning vanes is configured to turn the air vertically from the second direction to a third direction crosswise to the longitudinal axis into the air outlet;
a plurality of silencers disposed behind the wall adjacent the air outlet, wherein the plurality of silencers is disposed between the first and second pluralities of turning vanes; and a plurality of foreign object damage screens disposed between the wall, the first plurality of turning vanes, and the second plurality of turning vanes, wherein the plurality of FOD screens flank the air outlet.

16. The system of claim 15, wherein the modularized air inlet section is configured to couple directly to the air inlet plenum.

17. A system, comprising:
a gas turbine enclosure;
a gas turbine engine disposed in the gas turbine enclosure;
an air inlet plenum coupled to the gas turbine enclosure, wherein the air inlet plenum is configured to direct air to the gas turbine engine; and
a modularized air inlet system, comprising:
an air filter house section configured to receive the air via an air inlet; and
a transition/silencer section configured to direct the air from the modularized air inlet system, via an air outlet, into the air inlet plenum;
wherein the modularized air inlet system is coupled directly to the air inlet plenum and the gas turbine enclosure, and wherein the transition/silencer section comprises a wall disposed within the modularized air inlet system upstream of the air outlet relative to a longitudinal axis of the gas turbine enclosure, wherein the wall extends in a vertical direction from a top surface to a bottom surface of the transition/silencer section, and the wall extends in a horizontal direction beyond a perimeter of the air outlet; and
wherein the transition/silencer section comprises a first plurality of turning vanes configured to turn the air horizontally from a first direction parallel to the longitudinal axis to a second direction crosswise to the longitudinal axis towards the air outlet, and wherein the first plurality of turning vanes comprises a first set of turning vanes and a second set of turning vanes, and wherein the first set of turning vanes and the second set of turning vanes respectively flank and extend around first and second longitudinal ends of the wall, the first and second longitudinal ends being located along the horizontal direction.

\* \* \* \* \*